US007702659B2

(12) United States Patent
Ban et al.

(10) Patent No.: US 7,702,659 B2
(45) Date of Patent: Apr. 20, 2010

(54) ROBUST, SELF-MAINTAINING FILE SYSTEM

(75) Inventors: Amir Ban, Ramat Hasharon (IL); Menahem Lasser, Kohav Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 331 days.

(21) Appl. No.: 10/397,378

(22) Filed: Mar. 27, 2003

(65) Prior Publication Data

US 2004/0193564 A1   Sep. 30, 2004

(51) Int. Cl.
*G06F 12/00* (2006.01)
*G06F 17/30* (2006.01)

(52) U.S. Cl. .................. 707/202; 707/200; 707/205
(58) Field of Classification Search ............... 707/202, 707/204, 205, 200
See application file for complete search history.

(56) References Cited

U.S. PATENT DOCUMENTS

| | | | | |
|---|---|---|---|---|
| 5,371,885 A * | 12/1994 | Letwin | ............... | 707/205 |
| 5,414,840 A * | 5/1995 | Rengarajan et al. | ......... | 707/201 |
| 5,564,011 A * | 10/1996 | Yammine et al. | ............. | 714/15 |
| 5,809,527 A * | 9/1998 | Cooper et al. | ............... | 711/133 |
| 5,832,526 A * | 11/1998 | Schuyler | ..................... | 707/205 |
| 5,909,540 A * | 6/1999 | Carter et al. | ................... | 714/4 |
| 5,974,426 A * | 10/1999 | Lee et al. | .................... | 707/202 |
| 6,005,810 A * | 12/1999 | Wu | ....................... | 365/185.33 |
| 6,453,383 B1 * | 9/2002 | Stoddard et al. | ............ | 711/112 |

OTHER PUBLICATIONS

"Improving CHKDSK Performance for HIgh Performance File System Drives." IBM Technical Disclosure Bulletin, vol. 38, Issue 1, pp. 331-332. Jan. 1, 1995.*
"Microsoft Extensible Firmware Initiative FAT32 File System Specification: FAT: General Overview of On-Disk Format." Hardware White Paper, Version 1.03, Microsoft Corporation, Dec. 6, 2000.*

* cited by examiner

*Primary Examiner*—Apu M Mofiz
*Assistant Examiner*—Charles E Lu
(74) *Attorney, Agent, or Firm*—Toler Law Group

(57) ABSTRACT

A method of managing a data storage medium. One portion of the medium is reserved for storing data files and directories. Another, separate portion of the medium is reserved for storing allocation information related to the data in the first portion. Upon beginning a change of one of the data files or directories in the first portion, that data file or directory is flagged robustly until the change is completed. As needed, for example when the medium is mounted on a host system, the incomplete changes to the flagged data files and directories are undone or completed.

15 Claims, 6 Drawing Sheets

ROBUST, SELF-MAINTAINING FILE SYSTEM

FIELD AND BACKGROUND OF THE INVENTION

The present invention relates to file systems and, more particularly, to a file system that is robust with respect to unexpected interruptions such as sudden power loss and that is self-maintaining.

File systems, that enable computer applications to handle data, exist in all computer systems, and are generally supplied as part of the operating system. File systems, generally, specify a format and structure for data residing on a storage medium (e.g. a magnetic disk), provide an interface to the medium driver to handle physical data I/O, provide an interface to applications to perform data handling operations, (such as creating a file, reading data from files, and searching in directories), and provide the algorithms and procedures of physical data I/O requests by the applications.

Many different types of file systems are used in computer systems, each file system providing a different way of organizing and handling data. However, one type of file system, the DOS-FAT file system, is exceptionally common. This file system was originally developed for Microsoft's DOS™, and is now used in all Microsoft Windows™ operating systems. Because DOS-FAT is ubiquitous, most non-Microsoft operating systems (e.g. linux and Apple's Mac-OS™) that have their own file system also support DOS-FAT.

The DOS-FAT file system is also called simply the "FAT" file system or the "DOS" file system. "FAT" is an acronym for File Allocation Table, the central structure of this file system. The file system structure and format has remained very stable since its introduction in the 1980's, although several important additions to it have been made over the years, such as support for long filenames, and the FAT32 variant (to support very large disks).

A key requirement of a file system is that it be reliable and robust. Expected conditions in which the file system is used must not result in loss or corruption of data stored by it. Such conditions include a sudden and unexpected loss of power, or a rebooting of the system, or any similar action that results in file system operations being interrupted in an indeterminate stage. An even more basic requirement is that the file system format itself, as written on the disk, must not be damaged. If a file is being created while power is lost in the system, the fact that the contents of the file are in an indefinite state is often not a problem, as the application creating it may be rerun. But if such a mishap will result in the contents of directories being damaged or lost, the damage will be more pervasive and possibly irreversible, as a large part of the storage medium (or the entire storage medium) may become inaccessible.

The DOS-FAT file system is extensively documented in many places, for example, Ray Duncan, *Advanced MSDOS Programming, Second Edition*, Chapter 10: Disk Internals (Microsoft Press, 1988). The following aspects of DOS-FAT are the ones that are most relevant to the present invention:

A DOS-FAT storage medium is physically divided into sectors (traditionally of 512 bytes each). From the file system's point of view, the storage medium is a linear array of sectors, starting from the first sector, sector 0.

The lowermost sectors of the storage medium contain the basic DOS-FAT structures, including the FAT (file allocation table). These are followed by the rest of the storage medium, which contains all the file and directory data and the available free space. This part is divided into allocation units, also called clusters. An allocation unit is the minimum space that can be allocated to a file or directory, and its size is fixed throughout the storage medium. The size of the allocation unit is a multiple of a sector size, e.g. 4 Kbytes (=8 sectors).

The FAT is a table that indicates the status of each allocation unit. A FAT entry may show that an allocation unit is free space, or it may show that the allocation unit is allocated to a file (though it will not show to which file). In the latter case, the FAT entry also indicates what the next allocation unit for the file is, or indicates that this allocation unit is the last allocation unit for the file. This organization leads to a file having a FAT chain: a list of chained entries in the file allocation table showing which allocation units belong to the file and in which order.

For allocation purposes, a directory is just a file, albeit a file with special contents that are recognized as such by the file system. A directory file contains an array of directory entries, each directory entry being of 32 bytes and separated into several fields. Each directory entry describes one file that is in that directory. If long filenames are supported, several directory entries may be used to describe a file. One of the fields in the directory entry is the starting cluster field, indicating the initial allocation unit (cluster) of the file. In this way the directory entry of a file is linked to the file's FAT chain.

Another field in the directory entry is the file size, which indicates the size in bytes of the file.

A file with a long name is described by several directory entries, the last of which is the short-form or legacy directory entry. The legacy directory entry is preceded by one or more directory entries that describe the full name of the file.

Because of this structure, an implementation of a DOS-FAT file system needs to do several things in order to execute a simple file system request. For example, to create a file called MYDATA.TXT with 1000 bytes of data, the file system needs to perform all of the following operations, not necessarily in this order:

1. Find a free directory entry in the parent directory and write a new MYDATA.TXT entry in the free directory entry.
2. Find a free FAT entry and mark the free FAT entry as belonging to a file.
3. Write the 1000 bytes of data to the corresponding allocation unit found in step 2.
4. Set the starting cluster field in the directory entry to the allocation unit number.
5. Set the file size field in the directory entry to 1000.

No matter what order this sequence of operations is done, more than one physical I/O operation is needed to do the operations. Therefore, loss of power may cause this sequence of operations, once begun, to be incomplete, leaving the medium structure in an inconsistent state.

For example, if step 2 is completed and step 4 is not, the FAT now denotes an allocation unit as belonging to a file. However, this allocation unit is nowhere pointed to by any file. The result is that this allocation unit is lost to further allocation, as there is no mechanism to delete or reuse it.

The same applies to the process of deleting a file. File deletion requires the operations of marking the directory entry of the file as deleted, and marking each of the FAT entries in the file's FAT chain as free. No matter in what order these operations are done, an interruption will cause an inconsistency in the medium structures. Deleting the FAT entries first risks leaving the directory entry "alive" so the file is seen as still existing. Furthermore, the entry's starting cluster still points to FAT entries that have now been made available for new allocations, so eventually these entries will be allocated to another file. Deleting the directory entry first avoids this, but risks making the entire FAT chain or part of it inaccessible if the delete process is not allowed to conclude.

These are only two examples of a shortcoming of the DOS-FAT file system with regard to reliability and robustness. These shortcomings stem from the way the DOS-FAT media format is organized. The consequences of these shortcomings take several forms, several of the most common of which are:

1. Space on the storage medium may be marked as allocated, although it does not belong to any file. This is usually called the "lost cluster" effect, as there is a part of the storage medium that becomes "lost" to the file system. If such events occur many times, many lost clusters accumulate and cause medium capacity to diminish. In the file deletion example above, if the directory entry is deleted first, there is a risk that all or part of the FAT chain will become lost clusters.

2. Space on the storage medium may become marked as belonging to more than one file at the same time. This is known as a "cross link". This may cause several types of failures and data loss at a later stage. In the file deletion example above, if the FAT entries are deleted first, and an interruption leaves the directory entry "alive", a subsequent allocation of the FAT entries to another file causes a cross link in which two files apparently, and inconsistently, share the same space in the storage medium.

3. Most DOS-FAT systems have several identical copies of the FAT. These copies may become unsynchronized.

Several other failure patterns are also possible, each causing a specific kind of damage or risk to existing data.

These failure modes of the DOS-FAT file system have been well known for a long time, and maintenance tools have been provided to deal with them. Originally, DOS™ supplied a utility called CHKDSK, which could be run at any time by the user to scan a DOS-FAT disk for inconsistencies, and optionally could repair the inconsistencies (often by applying guesswork as to what the correct state should be). In DOS™ version 6.0 and later in Windows™ operating systems, CHKDSK was replaced by SCANDISK, a more sophisticated utility that essentially did the same as CHKDSK.

Running of CHKDSK- or SCANDISK-type utilities are left to the system user to run, i.e. the user is expected to perform maintenance to the disk, and to be able to deduce when such maintenance is necessary. That this is not a satisfactory solution has long been recognized. In most current versions of the Windows™ operating systems, Windows™ automatically offers to run SCANDISK whenever it detects that the system has not been shut down in an orderly manner.

This maintenance utility solution to the problem is even less appropriate for operating systems like Windows CE™, which is used as the operating system of many consumer appliances such as organizers and mobile phones. The user of an appliance expects the appliance to always work well and is either incapable or unwilling to maintain it, even if provided with tools to do so. The need to provide a reliable but self-maintaining file system for such devices is therefore urgent.

File systems that are robust with respect to unexpected interruptions are known. One such file system is the Journaling Flash File System (JFFS). JFFS is simply a log-structured list of nodes on the storage medium. Each node contains information about the associated file and possible file data. If data are present, the node contains a field that indicates the location in the file where data should appear. This prevents new data from overwriting old data. The node also contains information about then amount and location of data to delete from the file. This information is used for truncating files or overwriting selected data within a file. In addition, each node contains information that is used to indicate the relative age of a node. In order to recreate a file, the entire medium is scanned, the individual nodes are sorted in order of increasing version number and the data are processed according to the instructions in each node.

JFFS writes to the storage medium in a cyclic manner. New nodes simply are appended until the end of the storage medium is reached. Before the end of the storage medium is reached, the first block of the storage medium must be freed for use. This is accomplished by copying all valid nodes (i.e. nodes that have not been made obsolete by later nodes) and then erasing the block.

JFFS is robust with respect to unexpected interruptions such as power loss. If the system crashes or experiences an unexpected loss of power, only the last node written might be affected. The affected file can be recreated except for the changes described by the affected node. This robustness comes at the expense of inefficient storage and retrieval of data. The number of bytes required to store a file can be significantly greater than the actual file size.

Another drawback of JFFS is that it is incompatible with DOS-FAT-like file systems, which use separate areas of the storage medium for the DOS-FAT structures and for the data whose storage allocation is described by the DOS-FAT structures.

There is thus a widely recognized need for, and it would be highly advantageous to have, a file system that is both compatible with DOS-FAT-like file systems and robust with respect to unexpected interruptions.

SUMMARY OF THE INVENTION

According to the present invention there is provided a method of managing at least one medium for storing at least one data file, including the steps of: (a) reserving a first portion of the at least one medium for storing the at least one data file; (b) reserving a second portion of the at least one medium, separate from the first portion, for storing allocation information related to the first portion; and (c) whenever beginning to change one of the at least one data file, providing a robust indication that a change of the one data file has begun.

According to the present invention there is provided a data storage system including: (a) at least one medium including: (i) a first portion for storing the data in at least one file, and (ii) a second portion, separate from the first portion, for storing allocation information related to the first portion; (b) a changing mechanism for changing the at least one file; and (c) a flagging mechanism for, whenever the changing mechanism begins to change one of the at least one file, providing a robust indication that the change has begun.

According to the present invention there is provided a computer-readable code storage medium having computer-readable code embodied on the computer-readable code storage medium, the computer-readable code for managing a data storage system that includes at least one data storage medium, the computer-readable code including: (a) program code for storing the data in at least one file in a first portion of the at least one data storage medium; (b) program code for storing allocation information related to the first portion in a second portion of the at least one data storage medium that is separate from the first portion; (c) program code for changing the at least one file; and (d) program code for, whenever a change of one of the at least one file is begun, providing a robust indication that the change has begun.

For generality, the present invention is claimed herein in terms of managing "at least one" medium for storing data. Nevertheless, the description below is in conventional terms of a DOS-FAT file system that manages the storage of data on a single storage medium, with both the DOS-FAT structures and the data being stored on the same medium. A first portion of the medium is reserved for storing one or more (almost always many more than one) data files and/or directories. (Recall that, as described above, DOS-FAT treats directories as special kinds of files.) A second portion of the medium, separate from the first portion, is reserved for storing allocation information, such as FAT tables, that is related to the storage of the data in the first portion of the medium. The file system of the present invention, like all file systems, manages changes to the data files, such as writing to a data file (including creating or extending the data file and closing the data file), deleting a data file and renaming a data file. When such a change is begun, a robust indication that the change has begun is provided. By a "robust" indication is meant an indication that survives an unexpected interruption such as a power loss and that, upon resumption of operation, indicates unambiguously how to either undo or complete the interrupted change. Upon completion of a change to a data file, the associated robust indication is removed. As needed, for example when the storage medium is mounted on a host system, for each data file that has a robust indicator, the change that prompted the provision of the robust indicator, and whose interruption resulted in the persistence of the robust indicator, is either undone or completed. If the attempted change is undone, then the associated data file is restored to its state immediately preceding the attempted change. Note that the term "mounting", as used in the art, refers to the logical operation of recognizing and preparing a storage medium for work with a file system. For example, when a computer with a hard disk is turned on and booted, the hard disk is mounted, even though the hard disk was physically connected to the computer bus even before the computer was turned on.

Preferably, whenever a robust indication is provided for a data file that is about to be changed, a global indication that such a robust indication now is present also is provided. Subsequently, when it becomes necessary to check for the presence of robust indications, the presence of the global indication is checked for first. If the global indication is absent, that indicates that no robust indications are present either. If the global indication is present, then the robust indications are found, the corresponding interrupted changes to the data files are undone or completed, and the global indication is removed.

Preferably, at least one of the robust indications is an attention flag in the first portion of the storage medium. Alternatively, at least one of the robust indications is an attention flag in the second portion of the storage medium.

As a third alternative, a third portion of the storage medium is used to store at least one of the robust indications. In addition to a portion that contains the basic DOS-FAT structures and a portion that contains the general data area, a DOS-FAT storage medium also includes a master boot header, a DOS boot header and a root directory. Optionally, at least one of the robust indications is an attention flag in the root directory.

The scope of the present invention includes the method of the present invention, a corresponding data storage system including appropriate mechanisms for implementing the method of the present invention, and a corresponding computer-readable code storage medium in which is embedded computer-readable code for implementing the method of the present invention. When it is necessary, for clarity, to distinguish this computer-readable code storage medium from the storage medium that is managed by the method of the present invention, the storage medium that is managed by the method of the present invention is called herein a "data storage medium".

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
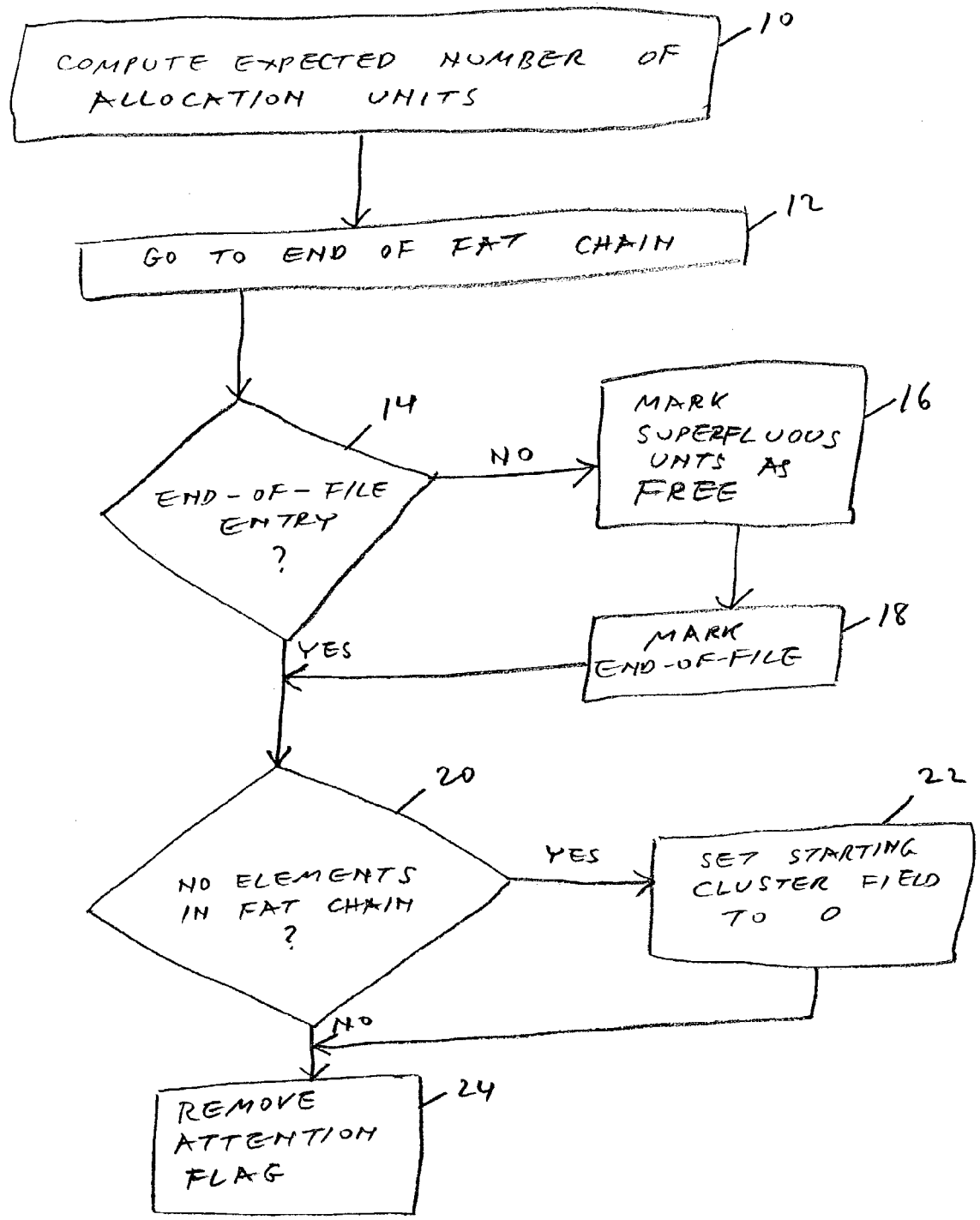
FIG. 1 is a flow chart of auto-repair of file creation/extension.

The present invention is of a DOS-FAT-compatible file system that is robust with respect to unexpected interruptions such as power failures and host system crashes.

The principles and operation of a file system according to the present invention may be better understood with reference to the drawings and the accompanying description.

A basic problem in overcoming the effects of an unanticipated interruption while performing a DOS-FAT operation is that when the host system is restarted, and the DOS-FAT file system is restarted on the storage medium, all records of the operations that were in progress and did not go to completion are lost. Because of this, even if the fact that the system was not shut down properly is known, there is no information available on where medium inconsistencies may occur, and if they do, what repair is appropriate.

The present invention introduces robust indicators in the form of attention flags, which are explicit markings on the storage medium that denote where an inconsistent state may be found. Attention flags are marked in a way that makes explicit from this marking both the state of the indicated structures and the appropriate method for repair.

The present invention implements a DOS-FAT file system, and while performing a compound operation potentially leading to an inconsistent state if incomplete, marks an attention flag that unambiguously marks the relevant structures and the repair process. When such a compound operation is executed to completion, the attention flag is removed.

When the file system of the present invention initially mounts the storage medium, the file system searches for existing attention flags. If such flags are present, a procedure of auto-repair is activated, the effect of which is, for each attention flag, to apply the appropriate repair procedure and then to remove the attention flag.

At the end of the mount and auto-repair procedures, the storage medium is guaranteed to be in a consistent state and free of attention flags. Normal file system operation can then begin by servicing application requests.

Attention flags may be marked in many ways. To be identified as such, such a marking needs to be such that it can be distinguished from a normal DOS-FAT format. For example, an attention flag can be a negative number in a field that is necessarily positive, or the setting of a bit flag that is unused by standard DOS-FAT, or a descriptive structure in a hidden list that is not present in a standard DOS-FAT file system.

Attention flags should unequivocally identify the DOS-FAT structures involved and the repair that is necessary. Preferably, there should be an efficient way to locate the attention flags on the storage medium so that the auto-repair procedure does not place undue overhead on file system startup. Also preferably, attention flags should be placed such that their marking and unmarking does not lead to extra physical I/O and so slow file system throughput.

Finally, the handling of attention flags must not change the storage medium if the structures indicated are already in a consistent state. In other words, a superfluous attention flag must not cause any damage.

Attention flags may be of several types. A directory entry attention flag indicates a directory entry, either by being marked within the directory entry or by pointing to the directory entry from an external structure. A FAT entry attention flag indicates a FAT entry, either by being marked within the FAT entry or by pointing to the FAT entry from an external structure. A global attention flag indicates the presence of other attention flags on the storage medium, and optionally provides information on where to find the other attention flags.

The preferred embodiment described below meets all the above requirements and uses only directory entry attention flags and a global attention flag. Specifically, the directory entry attention flags are the two high-order bits of the flags fields of the directory entries. These bits are unused and so are set to zero in a standard DOS-FAT file system. Bit 7 of the flags field is used to denote a rename-operation attention flag. Bit 6 of the flags field is used for all other operations. A global attention flag is denoted by setting to 0 the second FAT entry in the first FAT. (In a standard DOS-FAT file system, the second entry in the first FAT is set to hexadecimal FF's.)

There are six kinds of changes to data files that need to be flagged with attention flags: file create/extend, file delete, file rename, directory create/extend, directory delete and directory rename.

File Create/Extend

When a new allocation unit is appended to a file, either when the file is initially created or when data are appended to an existing file, the file's directory entry is marked with an attention flag in bit 6 of the flags field. If the allocation unit is the first allocation unit of the file, then the attention flag is set concurrently with the starting cluster field.

Extending a FAT chain is done in the following order: First, a free FAT entry is located, and then the previously "last in chain" FAT entry is modified to point to the just-located free FAT entry. Finally, the new FAT entry is marked as an end-of-FAT-chain (hexadecimal FF's).

The writing of new data to the file can be done at any convenient time in this sequence. Writing new data normally is done after the free allocation unit has been located.

The attention flag remains set as long as the file is open for writing. When the file is closed, the file's new size is updated in the directory entry, as are the date/time fields. Concurrently, the attention flag is removed.

Referring now to the drawings, FIG. 1 is a flow chart of the action taken during auto-repair if an attention flag is found for the directory entry. In block 10, the number of allocation units for the file is computed by dividing the file size by the size of the allocation unit and rounding up. In block 12, the FAT chain is traversed to its end. In block 14, it is determined whether a free entry (hexadecimal 0) or an end-of-file entry (hexadecimal FF's) marks the chain end. If the FAT chain for the file has more allocation units than computed, the superfluous allocation units are deleted and marked as free in block 16. The order of deletion is opposite to the order of the chain.

In block 18, the last FAT entry in the chain is marked as end-of-chain (hexadecimal FF's). If, in block 20, it is determined that there are no elements in the chain (file size is 0), then in block 22 the starting cluster field of the directory entry is changed to 0. Finally, in block 24, the directory entry attention flag is removed.

File Delete

The directory entry of the file is marked as deleted, and concurrently, bit 6 of the directory entry's flags field is set as an attention flag. If any long-name directory entries are attached to this directory entry, these directory entries also are marked as deleted. The file's FAT chain then is deleted, in reverse order. First, the last entry in the chain is marked as free, then the penultimate entry is marked as free, etc., until the first chain entry is marked as free. Once all FAT chain entries have been deleted, the directory entry's attention flag is cleared.

Figure 2:
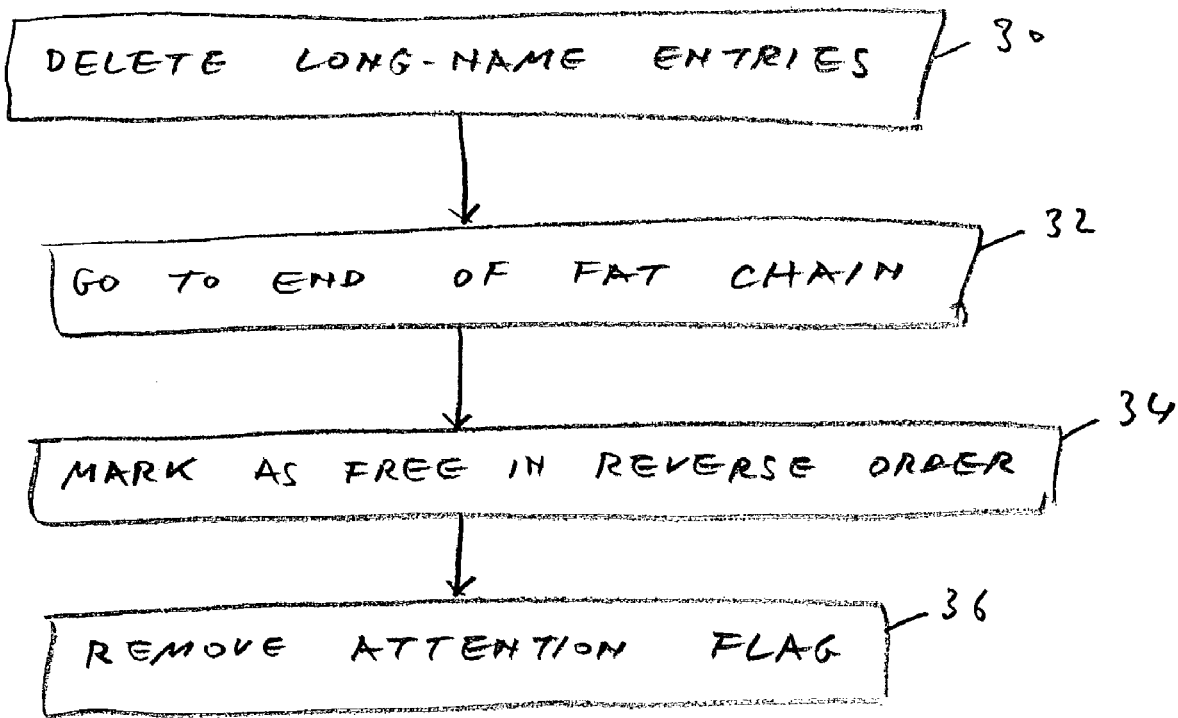
FIG. 2 is a flow chart of auto-repair of file and directory deletion.

FIG. 2 is a flow chart of the action taken during auto-repair if an attention flag is found for the directory entry. In block 30, any long-name entries attached to this directory entry are marked as deleted. In block 32, the FAT chain is traversed to its end. Either a free entry (hexadecimal 0) or an end-of-file entry (hexadecimal FF's) marks the chain end. In block 34, all entries in the chain are deleted and marked as free (hexadecimal 0). The order of deletion is reversed to the order of the chain. Finally, in block 36, the directory entry attention flag is removed.

File Rename

A directory entry with the new name is created, with all fields given their directory entry. Concurrently, the rename-operation attention flag is set, in bit 7 of the flags field of the new directory entry. The old name directory entry then is marked as deleted. Any long name directory entries attached to the old name directory entry also are marked as deleted. Finally the file size field is updated by copying from the old name directory entry, and the attention flag is concurrently reset.

Figure 3:
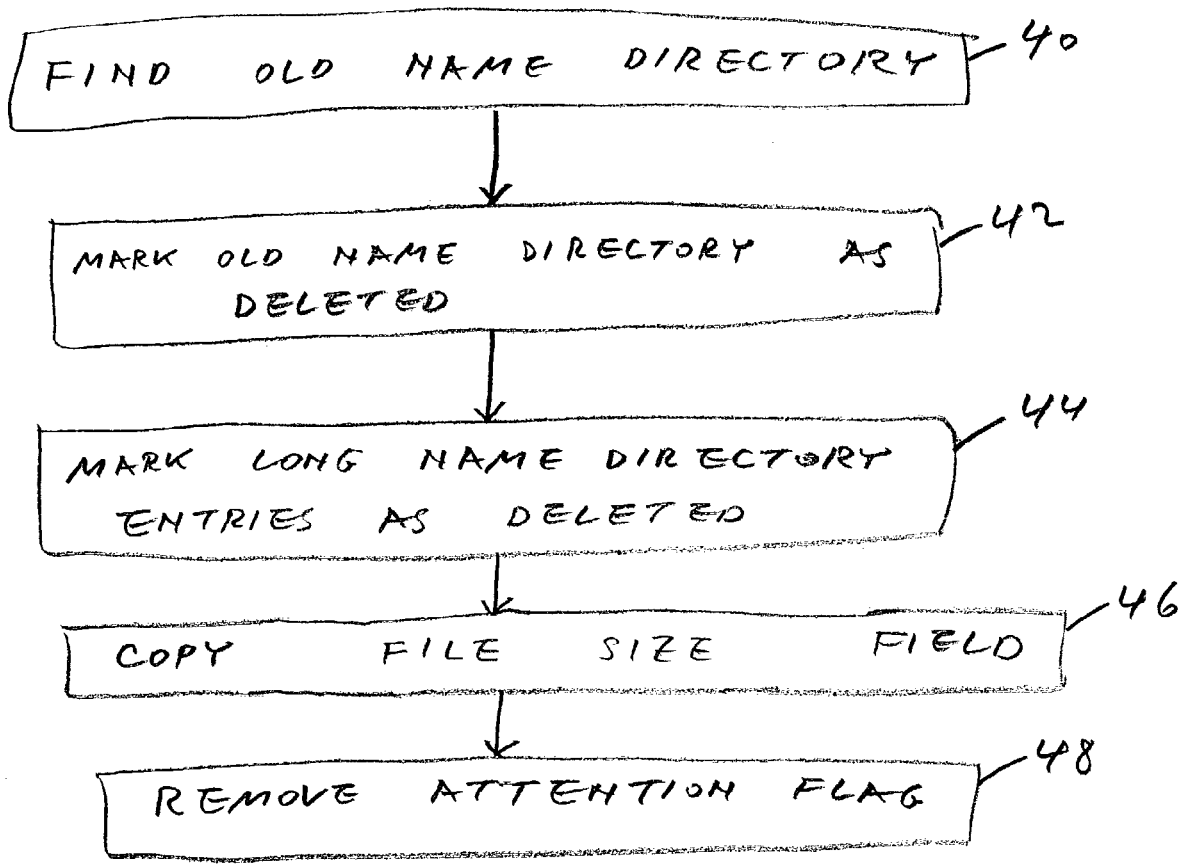
FIG. 3 is a flow chart of auto-repair of file and directory renaming.

FIG. 3 is a flow chart of the action taken during auto-repair if an attention flag is found for the directory entry. In block 40, the file size field is used to find the old name directory entry. In block 42, the old name directory entry is marked as deleted. In block 44, any long name directory entries attached to the old name also are marked as deleted. In block 46, the file size field is copied from the old name directory entry. Concurrently with copying the file size field from the old name directory entry, the directory entry attention flag is removed in block 48.

Directory Create/Extend

The handling of directory creation (make directory) and extension is similar to the handling of file creation and extension, but with some significant differences, as follows:

1. There is no close operation for directories, so the directory operation is seen as being followed by an implicit close operation.

2. DOS-FAT directories cannot be empty. As a minimum, a DOS-FAT directory must contain the mandatory '.' and '..' entries.

3. The contents of a directory must be legal directory entries, meaning that a new allocation unit for a directory must contain binary zeroes to indicate free directory entries. In case an allocation unit is the first allocation unit of a directory, the first two directory entries must be the mandatory '.' and '..' entries.

4. The file size field of a directory is always set to 0 and does not indicate the directory's actual size.

When a new allocation unit is appended to a directory, either when a directory is initially created or when an existing directory is appended, the directory's directory entry is marked with an attention flag in bit 6 of the flags field. If the allocation unit is the first allocation unit of the directory, then the attention flag is marked concurrently with the starting cluster field. Next, the FAT chain of the directory is extended. First, a free FAT entry is located, then the contents of the allocation unit is initialized (see more on this below), and then the previously last-in-chain FAT entry is modified to point to the newly located FAT entry, which is marked as end-of-FAT-chain (hexadecimal FF's). Finally, the attention flag is removed.

The initialization of a directory's allocation unit consists of filling the allocation unit with binary zeroes. In addition, if the allocation unit is the first allocation unit of the directory, then the first two directory entries are written as the mandatory '.' and '..' entries.

Figure 4:
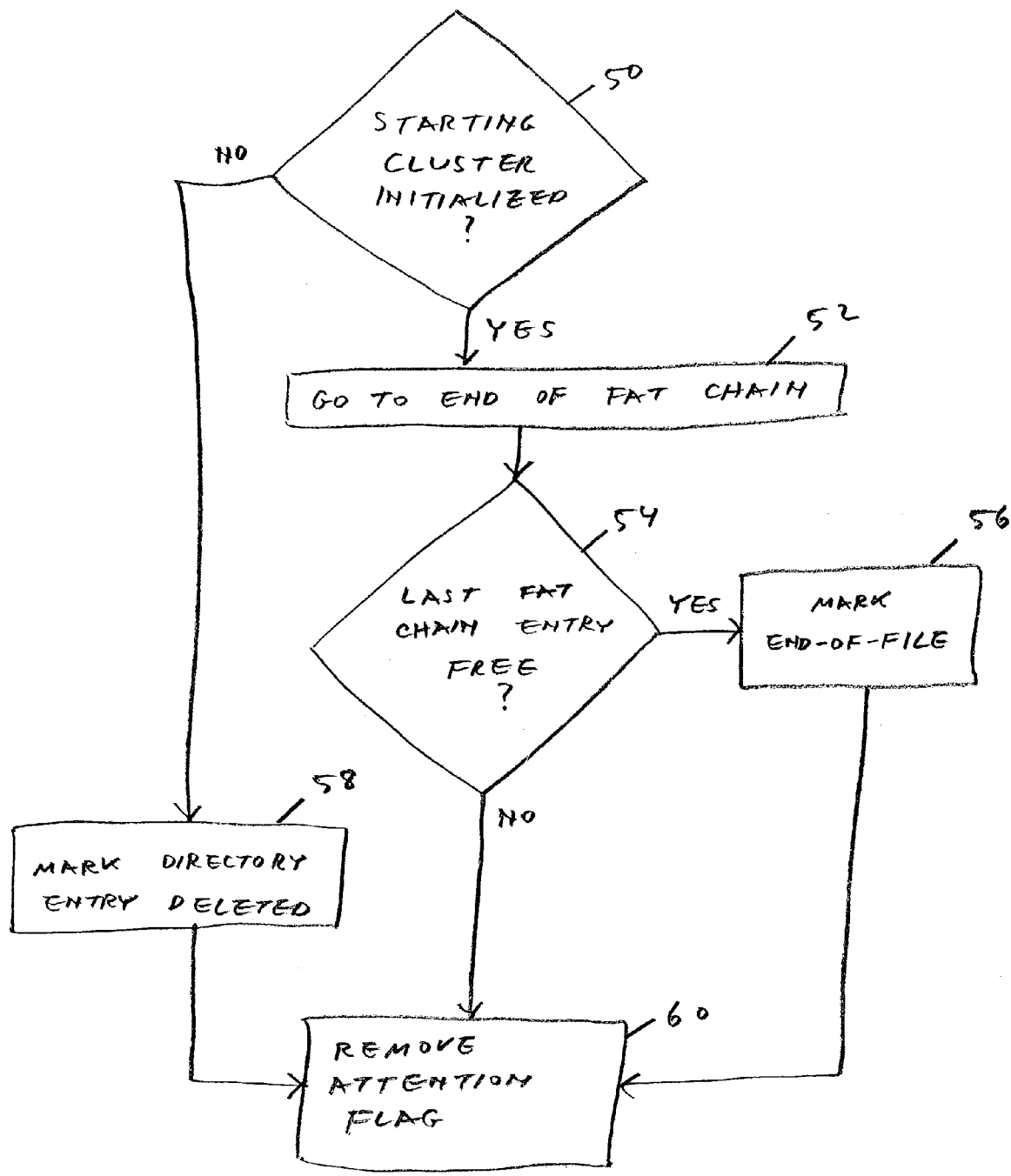
FIG. 4 is a flow chart of auto-repair of directory creation/extension.

FIG. 4 is a flow chart of the action taken during auto-repair if an attention flag is found for the directory entry. If in block 50 it is determined that the directory entry's starting cluster is uninitialized (0), then processing ends by marking the directory entry as deleted in block 58 and concurrently removing the attention flag in block 60 (this is in keeping with the principle that a directory may not be empty). Otherwise, in block 52, the FAT chain is traversed to its end. Either a free entry (hexadecimal 0) or an end-of-file entry (hexadecimal FF's) marks the end of the chain. If it turns out (block 54) that the last FAT entry in the chain is a free entry, then in block 56 this entry is marked as end-of-chain (hexadecimal FF's). Finally, the directory entry attention flag is removed in block 60.

Directory Delete/Rename

The handling of these directory operations is identical to the handling of file delete/rename.

The global attention flag is an optional feature of the present invention that improves performance by enabling a complete bypass of the auto-repair procedure when appropriate. When set, the global attention flag indicates that other attention flags exist on the storage medium. Conversely, if the global attention flag is not set, then there are no attention flags on the storage medium.

In the preferred embodiment of the present invention, the global attention flag is set by setting the second FAT entry of the first FAT to 0. The global attention flag is set the first time another attention flag is set. The global attention flag is cleared when an orderly dismount of the storage medium, including closing of all open files, is performed.

Figure 5:
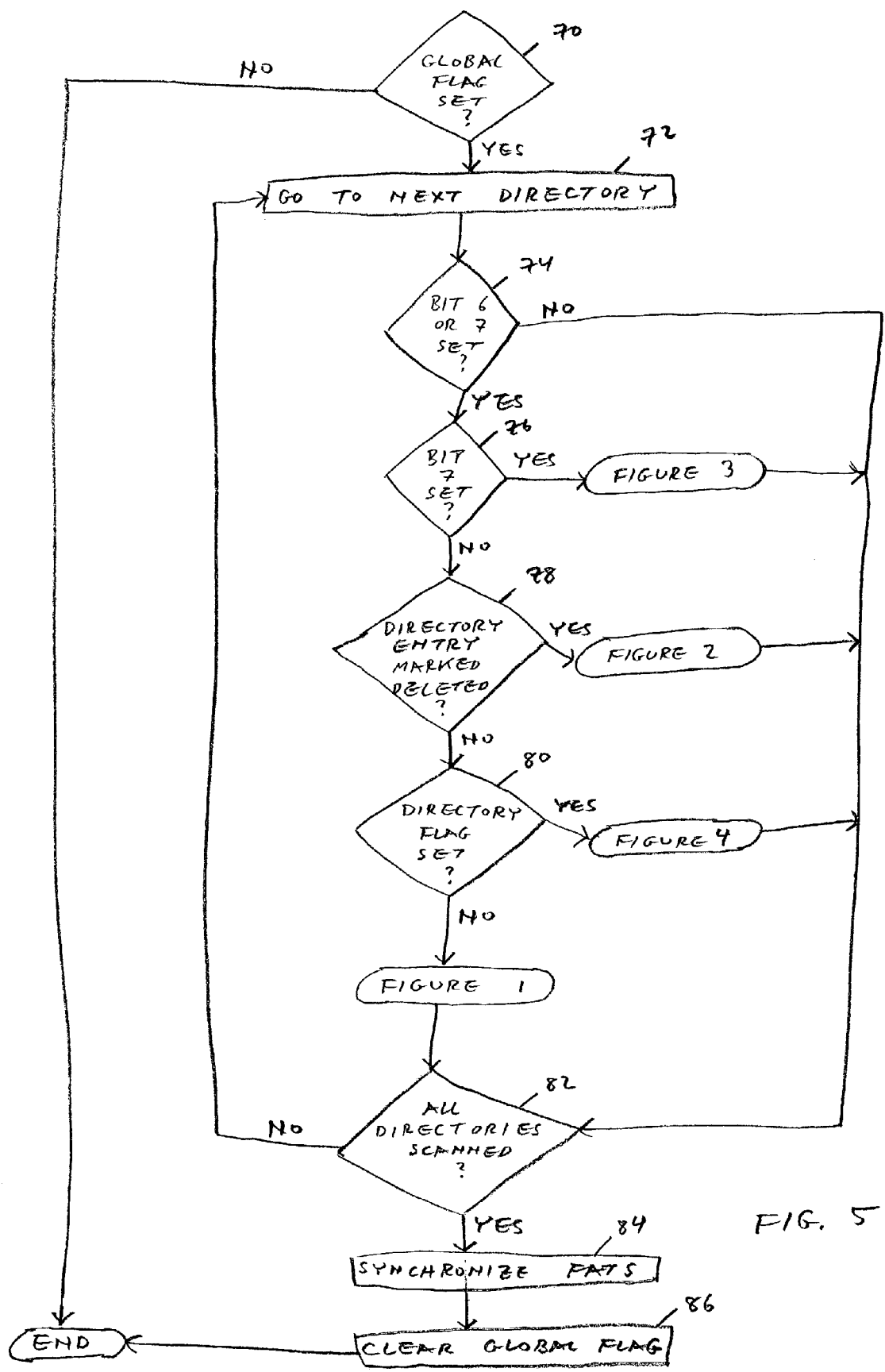
FIG. 5 is an overall flow chart of auto-repair.

FIG. 5 is an overall flow chart of the auto-repair procedure. The auto-repair procedure is activated whenever the file system of the present invention mounts a storage medium, before any application request is serviced.

First, the global attention flag is checked in block 70. If the global attention flag is not set, then auto-repair has nothing to do and the procedure ends. If the global attention flag is set, then all directory entries are scanned (blocks 72 and 82) to find attention flags. The scan preferably is done in a depth-first-search manner, starting with the root directory. In each directory, all directory entries are scanned, including entries marked as logically deleted. When a directory entry with an attention flag (i.e. having one of the two high-order bits of the flags field set) is encountered (block 74), the attention flag is processed according to the auto-repair procedures as given above for specific file system operations: If bit 7 of the flags field is set (block 76), then auto-repair for file/directory rename is done, as illustrated in FIG. 3. Otherwise, if the directory entry is marked as deleted (block 78), then auto-repair for file/directory delete is done, as illustrated in FIG. 2. Otherwise, if the directory entry has the directory flag set (block 80), then auto-repair for directory creation/extension is done, as illustrated in FIG. 4. Otherwise, auto-repair for file creation/extension is done, as illustrated in FIG. 1.

When all attention flags have been found and repaired, auto-repair concludes in block 84 by synchronizing the FAT copies (if there is more than one FAT). Copies of the FAT other than the first FAT are compared to the first FAT, and wherever different are updated to the first FAT contents. Finally, in block 86, the global attention flag is cleared.

Figure 6:
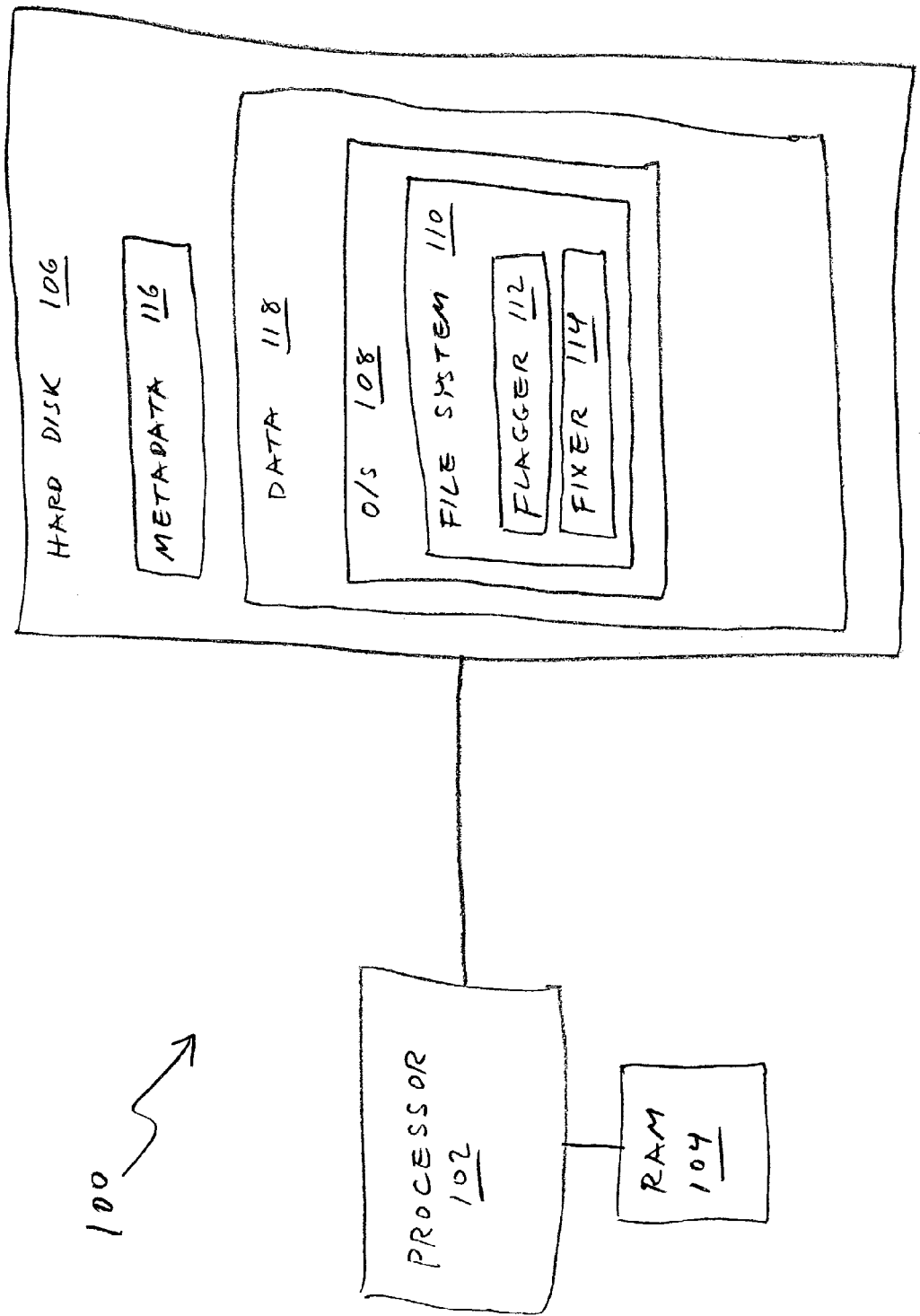
FIG. 6 is a schematic diagram of a data storage system of the present invention.

FIG. 6 is a schematic illustration of a data storage system of the present invention: a computer 100 that includes a processor 102, a random access memory (RAM) 104 and a hard disk 106.

Part of hard disk 106 is reserved for storing an operating system 108 of the present invention, which serves as the operating system of computer 100. When computer 100 is booted, operating system 108 is loaded into RAM 104. All subsequent activities of computer 100 are controlled by operating system 108. Operating system 108 includes a file system 110 of the present invention. File system 110 is based on a conventional DOS-FAT file system, and so includes code for managing the storage of user data files in a high address portion 118 of hard disk 106 with the help of DOS-FAT structures and similar metadata that are stored in a low address portion 116 of hard disk 106. In particular, file system 110 includes code for changing user data files and directories (file creation and extension, file deletion, file renaming, directory creation and extension, directory deletion and directory renaming), as described above. In addition, file system 110 includes code for implementing the preferred embodiment of the present invention. In particular, file system 110 includes code 112 for robustly flagging user data files and directories that are undergoing a change, and code 114 for repairing user data files and directories whose changes were unexpectedly interrupted. The conventional portion of file system 110, in combination with processor 102, thus constitutes a mechanism for changing the user data files and directories. Similarly, code 112, in combination with processor 102, constitutes a mechanism for flagging user files and directories while those user files and directories are being changed; and code 114, in combination with processor 102, constitutes a mechanism for repairing user files and directories whose change process was unexpectedly interrupted, by undoing or completing those incomplete changes.

Hard disk 106 also is an example of a computer-readable code storage medium in which is embodied computer readable, code (file system 110) for managing computer 100 as a file storage system.

The preferred embodiment of the present invention, in addition to meeting the primary goal of a robust and maintenance-free DOS-FAT file system, has advantages in the critical issues of compatibility and speed:

The preferred embodiment of the present invention is cross-compatible with any other DOS-FAT file system. It is able to handle any set of files created by another DOS-FAT file system. Conversely, any other DOS-FAT file system is able to handle a set of files created or handled by the preferred embodiment of the present invention. Furthermore the preferred embodiment of the present invention does not limit compatibility or storage medium space by using hidden areas.

The preferred embodiment of the present invention places little or no overhead on the processing of file system operations. Of all file system operations affected, by far the most common is the file create/extend operation. It will be apparent to those skilled in the art that the procedure described herein for this operation can be executed in essentially the same number of I/O operations as for any other DOS-FAT file system. For the other, less common operations, it will be apparent to those skilled in the art that the overhead in terms of additional I/O operations is at most one additional operation.

The auto-repair procedure of the present invention is relatively light, typically needing to scan no more than tens or hundreds of Kbytes of the storage medium, and so does not introduce a noticeable delay at system startup or medium mount. Furthermore, the mechanism of the global attention flag in many cases allows the procedure to be bypassed.

The auto-repair procedure is significantly lighter than CHKDSK/SCANDISK utilities or similar methods. To declare a cluster "lost", such tools would need to scan all FAT chains of all files and directories of the storage medium before concluding that the cluster belongs to none of them. By contrast, the auto-repair procedure of the present invention needs only to traverse the storage medium's directories and those FAT chains that are marked with an attention flag.

While the invention has been described with respect to a limited number of embodiments, it will be appreciated that many variations, modifications and other applications of the invention may be made.

What is claimed is:

1. A method to recover data, the method comprising:
   storing a data file comprising directory entries in a first portion of a data storage device;
   storing allocation information related to the first portion in a second portion of the data storage device separate from the first portion;
   in response to a detected change impacting the data file, wherein the change impacting the data file includes one of a file rename operation, a file create operation, a file extend operation, and a file delete operation:
      providing an indication in the data storage device when the change impacting the data file has not completed, wherein the indication comprises setting a flag within two high order bits of a flag field of one or more of the directory entries, wherein the indication indicates an inconsistent state of the data file,
      wherein, in response to the change impacting the data file being the file rename operation, one of the two high order bits of the flag field is set, and
      wherein, in response to the change impacting the data file being the file create operation, the file extend operation, or the file delete operation, the other of the two high order bits of the flag field is set;
   removing the indication when the change impacting the data file is complete; and
   in response to detecting the indication upon mounting the data storage device to a host system, processing the indication according to an auto-repair procedure.

2. The method of claim 1, further comprising:
   providing a global indication when the indication has been provided; and
   removing the global indication when the auto-repair procedure is complete.

3. The method of claim 1, further comprising storing a root directory in a third portion of the data storage device, the third portion separate from the first portion and the second portion.

4. The method of claim 1, wherein the auto-repair procedure comprises undoing the change of the data file.

5. The method of claim 1, wherein the auto-repair procedure comprises completing the change of the data file.

6. A data storage system comprising:
   a data storage device including:
      a first portion that stores a data file comprising directory entries, and
      a second portion, separate from the first portion, that stores allocation information related to the first portion;
   a flagging mechanism configured, to:
      in response to a detected change impacting the data file, wherein the change impacting the data file includes one of a file rename operation, a file create operation, a file extend operation, and a file delete operation:
         provide an indication in the data storage device when the change impacting the data file has not completed, wherein the indication comprises setting a flag within two high order bits of a flag field of one or more of the directory entries, wherein the indication indicates an inconsistent state of the data file,
         wherein, in response to the change impacting the data file being the file rename operation, one of the two high order bits of the flag field is set, and
         wherein, in response to the change impacting the data file being the file create operation, the file extend operation, or the file delete operation, the other of the two high order bits of the flag field is set; and
      remove the indication when the change impacting the data file is complete; and
   a repair mechanism configured, in response to detecting the indication upon mounting the data storage device to a host system, to process the indication according to an auto-repair procedure.

7. The data storage system of claim 6, wherein the flagging mechanism is further operative to provide a global indication when the indication is being provided, and wherein the repair mechanism is further operative to remove the global indication when the auto-repair procedure is complete.

8. The data storage system of claim 6, wherein the data storage device further comprises a third portion, separate from the first portion and the second portion.

9. The data storage system of claim 6, wherein the auto-repair procedure comprises undoing the change of the data file.

10. The data storage system of claim 6, wherein the auto-repair procedure comprises completing the change of the data file.

11. A computer-readable storage medium storing computer-readable code to manage an apparatus to recover data, the computer-readable code comprising program code that, when executed by a processor, causes the processor to:
   store a data file comprising directory entries in a first portion of a data storage device;
   store allocation information related to the first portion in a second portion of the data storage device that is separate from the first portion;
   in response to a detected change impacting the data file, wherein the change impacting the data file includes one of a file rename operation, a file create operation, a file extend operation, and a file delete operation:
      provide an indication in the data storage device when the change impacting the data file has not completed, wherein the indication comprises setting a flag within two high order bits of a flag field of one or more of the directory entries, wherein the indication indicates an inconsistent state of the data file,
      wherein, in response to the change impacting the data file being the file rename operation, one of the two high order bits of the flag field is set, and
      wherein, in response to the change impacting the data file being the file create operation, the file extend operation, or the file delete operation, the other of the two high order bits of the flag field is set;

remove the indication when the change impacting the data file is complete; and in response to detecting the indication upon mounting the data storage device to a host system, process the indication according to an auto-repair procedure.

12. The computer-readable storage medium of claim 11, further comprising program code that, when executed by the processor, causes the processor to:

provide a global indication when the indication is being provided; and remove the global indication when the auto-repair procedure is complete.

13. The computer-readable storage medium of claim 11, further comprising program code that, when executed by the processor, causes the processor to store a root directory in a third portion of the data storage device that is separate from the first portion and the second portion.

14. The computer-readable storage medium of claim 11, further comprising program code that, when executed by the processor, causes the processor to undo the change to the data file.

15. The computer-readable storage medium of claim 11, further comprising program code that, when executed by the processor, causes the processor to complete the change to the data file.

* * * * *

UNITED STATES PATENT AND TRADEMARK OFFICE
CERTIFICATE OF CORRECTION

| | | |
|---|---|---|
| PATENT NO. | : 7,702,659 B2 | Page 1 of 1 |
| APPLICATION NO. | : 10/397378 | |
| DATED | : April 20, 2010 | |
| INVENTOR(S) | : Ban et al. | |

It is certified that error appears in the above-identified patent and that said Letters Patent is hereby corrected as shown below:

In the Claims section, Column 12, Claim 6, Line 4, "a flagging mechanism configured, to:" should read --a flagging mechanism configured to:--.

Signed and Sealed this

Fourteenth Day of December, 2010

David J. Kappos
*Director of the United States Patent and Trademark Office*